(No Model.) 3 Sheets—Sheet 1.

M. H. & J. A. McBRYDE.
HAY AND COTTON PRESS.

No. 243,785. Patented July 5, 1881.

WITNESSES
INVENTORS (No Model.) 3 Sheets—Sheet 2.

M. H. & J. A. McBRYDE.
HAY AND COTTON PRESS.

No. 243,785. Patented July 5, 1881.

WITNESSES
Herman Moran.
Frank C. Bowen.

INVENTORS
M H McBryde
J A McBryde
By Liggett & Liggett
ATTORNEYS

N. PETERS, Photo-Lithographer, Washington, D. C.

(No Model.) 3 Sheets—Sheet 3.
M. H. & J. A. McBRYDE.
HAY AND COTTON PRESS.
No. 243,785. Patented July 5, 1881.
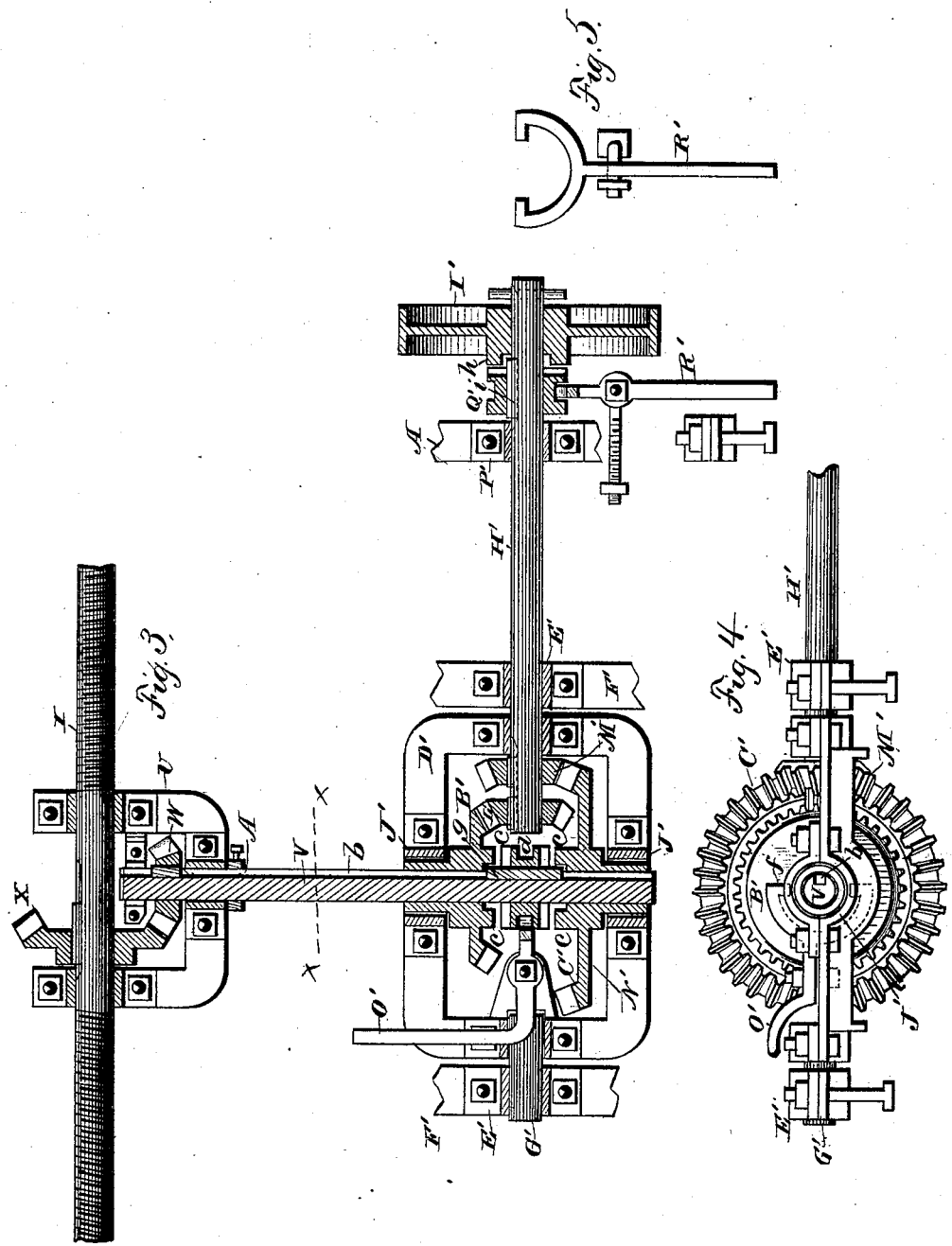
WITNESSES
Herman Moran.
Frank C. Bowen.
INVENTORS
M H McBryde
J A McBryde
By Serrett & Serrett.
ATTORNEYS

UNITED STATES PATENT OFFICE.

MALCOLM H. McBRYDE AND JOHN A. McBRYDE, OF LAURINBURG, N. C.

HAY AND COTTON PRESS.

SPECIFICATION forming part of Letters Patent No. 243,785, dated July 5, 1881.

Application filed May 23, 1881. (No model.)

*To all whom it may concern:*

Be it known that we, MALCOLM H. MCBRYDE and JOHN A. MCBRYDE, of Laurinburg, in the county of Richmond and State of North Carolina, have invented certain new and useful Improvements in Hay and Cotton Presses; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to an improvement in hay and cotton presses, the object of the same being to construct and hang the power-gearing in such a manner that when the platen has been raised above the top of the press-box, the platen, toggles, and communicating mechanism can be moved laterally from over the top of the press-box, in order to allow of the packing of the same without in any manner disengaging or disconnecting the power-gearing; and with these ends in view our invention consists in certain details in construction and combinations of parts, as will be more fully explained, and pointed out in the claims.

Figure 1:
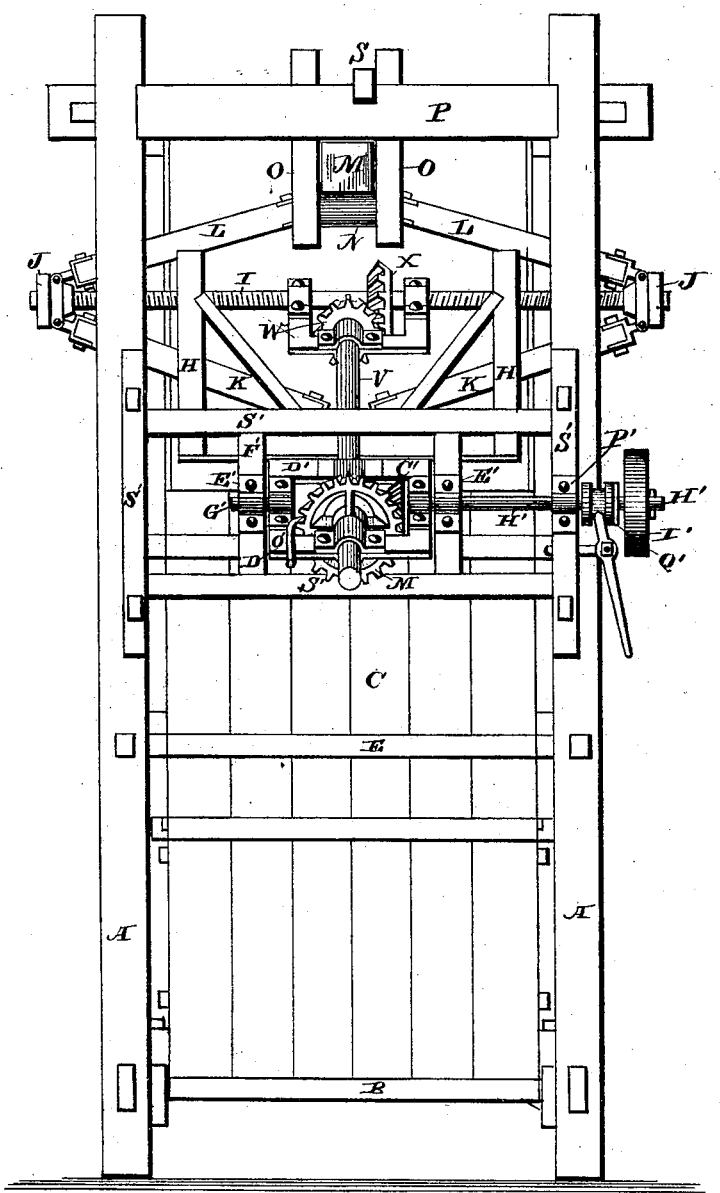
Figure 2:
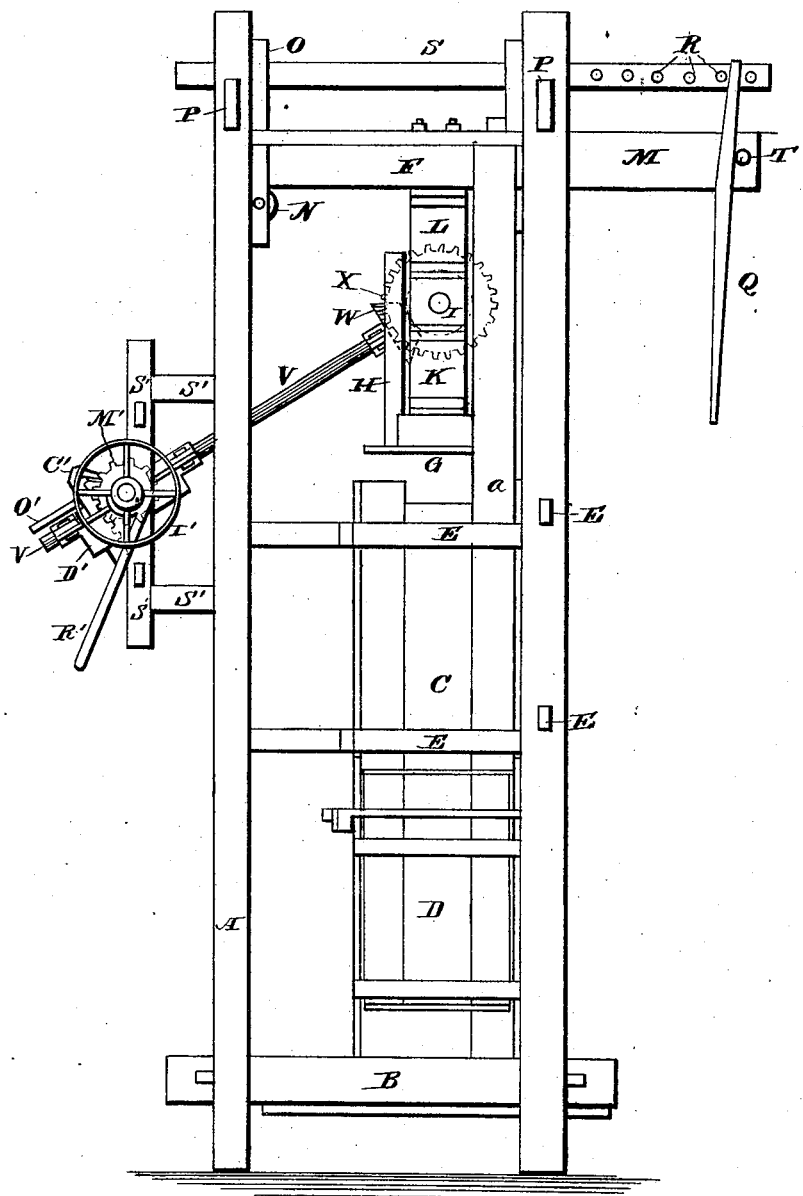

In the accompanying drawings, Figure 1 is a front view of our improved press. Fig. 2 is a side view of the same. Fig. 3 is a detached view of the power-gearing. Fig. 4 is a plan view through the lines $x\,x$ of Fig. 3; and Fig. 5 is a detached view of one of the shifting-levers.

A represents four upright standards, having the sills B secured thereto, which serve to support the press-box C, the latter having the door D on one side thereof, through which the bale is withdrawn after pressing. This door is provided with suitable locking mechanism to hold it securely in place while the platen is descending on and pressing the cotton or hay. The sides of the press-box C are strengthened by the braces E, secured in the upright standards A, at suitable distances apart, which support the box and prevent the same from becoming distorted when pressure is applied on the cotton contained therein. The pieces *a* on opposite sides of the press-box extend up to the beam F and form a guide for the platen G. The platen G is provided with a guide-frame, H, which fits snugly within the press-box and forms a bearing for the platen, and prevents the same from becoming wedged within the box when the cotton has been unequally distributed over the bottom of the same. This platen is actuated by the screw-rod I, which latter is provided with right and left hand screw-threads. On opposite ends of this screw-rod I are screw-threaded nuts J placed thereon, to which the toggle-levers K and L are hinged. The toggle-levers K pass inward and downward and are hinged to a plate secured to the top of the platen G, while the levers L extend upward and inward and are hinged to the sliding beam M. This beam is supported on the rollers N, which latter are journaled in the hangers O, suspended from the beams P, which bind the tops of the standards together and prevent them from bulging out. The sliding beam M is operated by the removable lever Q, which has its fulcrum between the pins R on the beam S, one end of the beam S projecting over the back of the frame for this purpose.

When it is desired to move the platen and guide-frame laterally to bring same over the press-box the lever is placed as shown in Fig. 2 and hand-power applied to the lower end thereof, and when desired to move the platen from over the press-box the lever is placed to the rear of the pin T, and power applied in the opposite direction.

The screw-rod I is barren of screw-threads for a considerable distance at its center, and is provided with a swinging frame, U, having a shaft, V, journaled therein, the latter being provided with a bevel-gear wheel, W, rigidly secured thereon, which meshes with the bevel-gear X, rigidly secured to the screw-rod I. This shaft is provided with a groove, *b*, extending throughout its entire length, and with a collar, A', adapted to bear up against the swinging frame U and prevent the shaft from entering any farther therein. The lower end of this shaft V passes through the bevel-gear wheels B' C', of unequal size, which latter are journaled in the oscillating frame D'. This frame D' is supported in the bearings E' on the uprights F' (the latter being held out from the standards A by the frame S') by the short shaft G' and the main driving-shaft H', the latter extending out at the side of the machine any required distance, and provided with a driving-pulley, I', loosely journaled thereon. The bevel-gear wheels B' and C' are journaled in the bearings J' on the oscillating frame D', and are adapted to turn independently of the shaft V. The upper wheel, B', is smaller than the lower wheel, and meshes with the bevel-wheel L' on the end of the main shaft H', and is adapted to be used to elevate the platen after pressing, and the lower and larger wheel adapted to mesh with the wheel M', journaled on the main shaft, behind the wheel L', and when thrown into engagement with the bevel-wheel C', causes the platen to descend. The opposing faces of the bevel-wheels B' and C' are provided with clutch-teeth c, with which the friction-clutch N' engages to operate the platen G. This clutch is provided with clutch-teeth on its opposite faces, while the periphery of the same is provided with an annular groove, d, in which the fingers f of the bent shifting-rod O' work. This clutch is situated on the shaft V, between the bevel-wheels B' and C', and slides on the feather g, which latter is loosely set in the groove b, between the faces of the bevel-wheels B' and C', and forms a guide for the clutch N', and causes same to turn with the shaft.

When the press-box has been filled and the platen properly adjusted, the clutch N' is brought in engagement with the wheel C', which transmits the motion to the shaft V, and from thence to the screw-bar I, through the intervention of the bevel-wheels W and X. When the pressing is completed the clutch is shifted to the upper smaller wheel, B', which reverses the motion of the screw-rod and draws the platen up to the top of the press-box. All the while the platen is descending the shaft V, which is secured to the swinging frame, is likewise descending, and is allowed to slide through the bevel-wheels B' and C' and through the oscillating frame D' without in any way retarding the operation of the machine, the swinging and oscillating frames in the meantime gradually accommodating themselves to the inclination of the shaft during such descent. When the pressing is completed the clutch N' is shifted so as to engage with the smaller bevel-wheel B', which reverses the motion heretofore described, and causes the platen to rise with greater rapidity than it descends.

The main shaft H' is journaled in a bearing, P', near its outer end, in the upright A, and is provided on its outer end with a band-pulley, I', loosely journaled thereon. This pulley is also provided with teeth h on its inner side, with which the teeth of the friction-clutch Q' engage when it is desired to operate the press. This clutch also has a peripheral groove, in which the fingers of the shifting-lever R' works. The clutch works on a feather, i, rigidly secured to the shaft H', which causes the friction-wheel to turn simultaneously with the main shaft.

The operation of the press is as follows: After the press-box has been filled with cotton or hay and the platen drawn in position over the same, the friction-clutch N' is brought in engagement with the large bevel-wheel C' and the clutch Q' in engagement with the band-pulley I', which causes the main shaft to turn, and transmits the motion to the screw-rod I, through the intervention of the power-gearing, and causes the platen to descend until the operation of pressing is completed, when the friction-clutch Q' is drawn out of engagement with the band-pulley, which causes the pressing mechanism to come to a standstill until the bands have been applied, when the clutch N' is thrown into engagement with the smaller wheel B' and the clutch Q' with the band-pulley I', which reverses the previous motion of the platen and causes same to rise, when the door D is opened and the bale rolled out, when the door is again closed and the platen moved from over the press-box, which is ready for refilling.

Instead of making the bevel-wheels B' and C' of unequal size, they may be of the same size and the wheel L' dispensed with, which will give the same speed to the platen while it is descending as it has while ascending.

It is evident that numerous changes in the construction and arrangement of parts might be resorted to without departing from the spirit of our invention; and hence we would have it understood that we do not limit ourselves to the exact construction of parts shown and described, but consider ourselves at liberty to make such changes as come within the spirit and scope of our invention.

Having fully described our invention, what we claim as new, and desire to secure by Letters Patent, is—

1. In a cotton or hay press, the combination, with the screw-shaft, toggle-arms, and platen, of a driving-shaft adapted to have endwise movement in an oscillating frame supporting the gearing by which the shaft is actuated, substantially as set forth.

2. In a cotton or hay press, the combination, with the screw-shaft, toggle-arms, and platen, of a shaft supported at one end in a swinging frame mounted on the screw-shaft and at its opposite end in an oscillating frame, substantially as set forth.

3. In a cotton or hay press, the combination, with the screw-shaft, toggle-arms, and platen, of a driving-shaft provided with a bevel-gear which meshes with a bevel-gear on the screw-shaft, said shaft being furnished with a groove or key-seat, a sliding clutch connected with the shaft by a key, and bevel-gearing mounted in an oscillating frame, substantially as set forth.

4. In a cotton or hay press, the combination, with the screw-shaft, toggle-arms, and platen, of an oscillating frame having gear-wheels mounted therein, and a shaft provided with a gear-wheel at one end which meshes with a gear-wheel on the screw-shaft, said shaft adapted to have endwise movement through the gears in the oscillating frame, and a sliding clutch for connecting either one of the gears in the oscillating frame with said shaft, substantially as set forth.

5. In a cotton or hay press, the combination, with the screw-shaft, toggle-arms, and platen, of the shaft V, oscillating frame D', shaft H', and suitable gearing for transmitting motion of the shaft H' to the screw-shaft in its various positions, substantially as set forth.

6. In a cotton or hay press, the combination, with the screw-shaft, toggle-arms, and platen, of the swinging frame U, shafts V, and H', oscillating frame D', large and small bevel-gears, and intermediate sliding clutch, substantially as set forth.

7. In a hay or cotton press, the combination, with the screw-shaft, toggle-arms, and platen, of a swinging frame, U, bevel-gears X W, shaft V, provided with key-seat or groove $b$, oscillating frame D', bevel-gears $g$, $h'$, L', and M', shaft H', and sliding clutch, substantially as set forth.

8. In a hay or cotton press, the combination, with the screw-shaft, toggle-arms, and platen, of the shafts V and H', oscillating frame D', journaled on the shafts G' and H', and suitable gearing for transmitting the motion of shaft H' to the screw-shaft in its various positions, substantially as set forth.

9. In a hay or cotton press, the combination, with the platen, screw-shaft, toggle-arms, and devices for raising and lowering the platen, of stirrups rigidly secured to the cross-girders at the top of the press-frame, said stirrups having rollers journaled in their lower ends and an adjustable beam, M, supported on said rollers, the upper toggle-arms, L L, being secured to the beam M, substantially as set forth.

10. In a cotton or hay press, the combination, with the platen and adjustable beam M, provided with pin T, of the beam S, provided with a series of pins, and a lever, Q, substantially as set forth.

In testimony that I, with JOHN A. McBRYDE, claim the foregoing I have hereunto set my hand this 12th day of May, 1881.

MALCOLM H. McBRYDE.

Witnesses:
A. W. BRIGHT,
HERMAN MORAN.

In testimony that I, jointly with MALCOLM H. McBRYDE, claim the foregoing I have hereunto set my hand.

J. A. McBRYDE.

Witnesses:
H. I. McDUFFIE,
J. R. JONES.